United States Patent

[11] 3,604,119

[72] Inventor Hiroshi Inoue
358-2, 1-Chome, Honda Machi, Chiba-ken, Japan
[21] Appl. No. 790,075
[22] Filed Jan. 9, 1969
[45] Patented Sept. 14, 1971

[54] AUTOMATIC SURVEYING APPARATUS
5 Claims, 22 Drawing Figs.

[52] U.S. Cl. .................................................. 33/142,
33/141.5, 33/206 D
[51] Int. Cl. ............................................... G01c 7/04,
G01c 9/06
[50] Field of Search ............................................. 33/206.5 L,
215.2, 215.3, 141.5, 142; 73/398 R, 405

[56] References Cited
UNITED STATES PATENTS

| | | | |
|---|---|---|---|
| 2,155,865 | 4/1939 | Leavenworth | 73/398 R |
| 2,155,903 | 4/1939 | Leavenworth | 73/398 R |
| 2,337,044 | 12/1943 | Holmes | 33/141.5 |
| 2,607,996 | 8/1952 | Moyer | 33/141.5 |
| 2,679,106 | 4/1954 | Moyer | 33/141.5 |

Primary Examiner—Leonard Forman
Assistant Examiner—Dennis A. Dearing
Attorney—Wenderoth, Lind & Ponack ABSTRACT: An automatic surveying apparatus has a controlled shaft mounted along the longitudinal axis of a vehicle for free rotation around its longitudinal axis. An automatic level controller maintains the position of said shaft constant with respect to the horizontal as the vehicle body inclines from side to side. An elevation-measuring level is mounted on the controlled shaft to produce an output with the change in elevation of the vehicle. Two lateral shafts, an adding shaft and a subtracting shaft, are rotatably mounted on said controlled shaft and extend laterally in opposite directions from said controlled shaft perpendicular to the longitudinal axis thereof and horizontally, and a departure-measuring level is mounted on each of said two shafts with the normally level position of each level parallel to the longitudinal axis of said controlled shaft, and a latitude-measuring level is mounted on each of said two shafts with the normally level position of each level perpendicular to the longitudinal axis of said controlled shaft. The adding and subtracting shafts are driven in opposite directions by means for indicating a reference azimuth proportional to the change in direction of said vehicle relative to the reference azimuth, the elevation-measuring level, departure-measuring levels and latitude-measuring levels are liquid levels having liquid pressure-sensitive electrical resistances therein responsive to changes in the liquid pressure in said levels in proportion to the amount the position of the levels changes, and each of said levels has an electrical circuit coupled thereto in which said resistances are incorporated for producing a current when the level is moved from its normal level. Power supply means provides a power output to the circuits in proportion to the speed of the vehicle. The circuits for the two departure-measuring levels are coupled to each other for producing a current flow in proportion to the departure of the vehicle from a point of origin, and the circuits for the two latitude-measuring levels are coupled to each other for producing a current flow in proportion to the latitude of the vehicle from a point of origin. Integrating means integrates the output of said circuits.

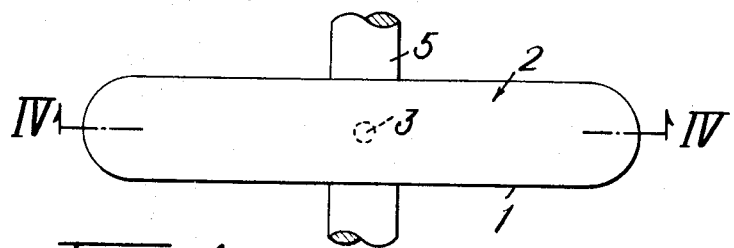
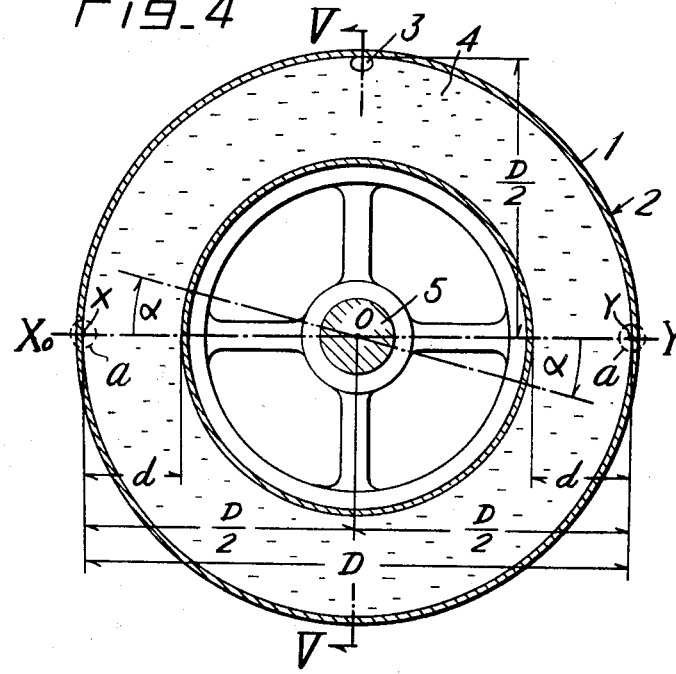
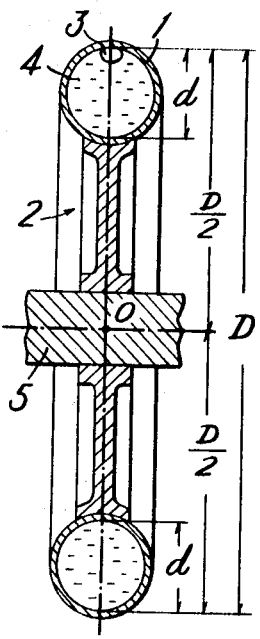
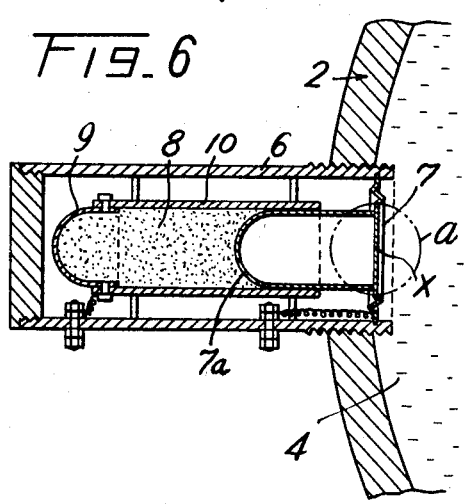
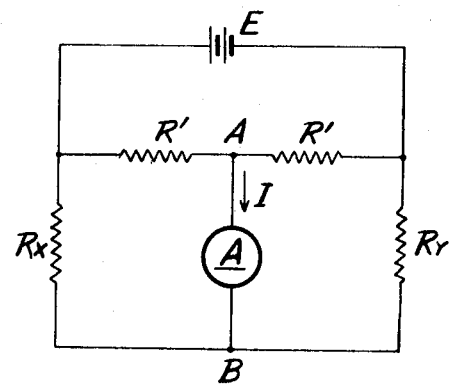

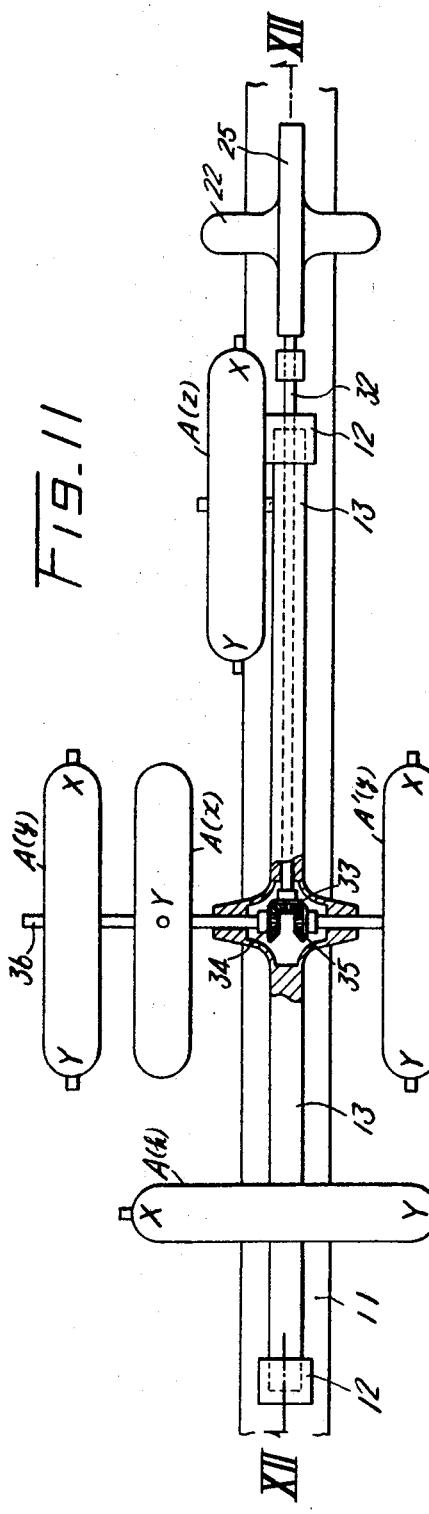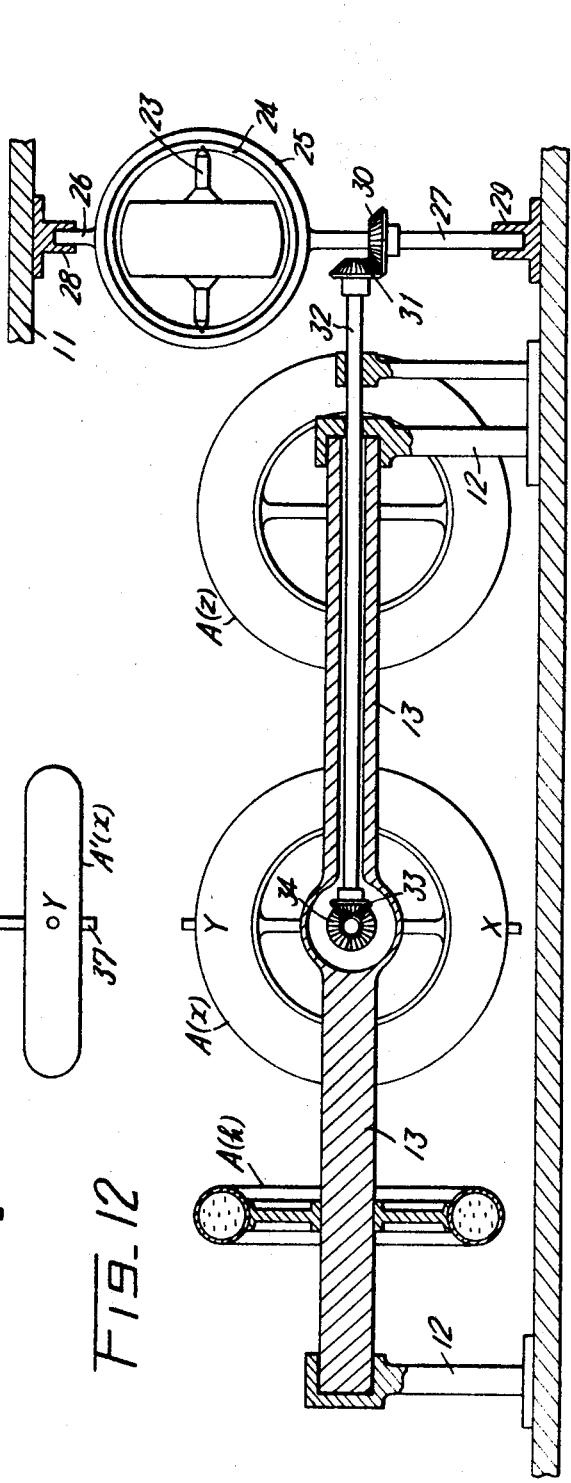

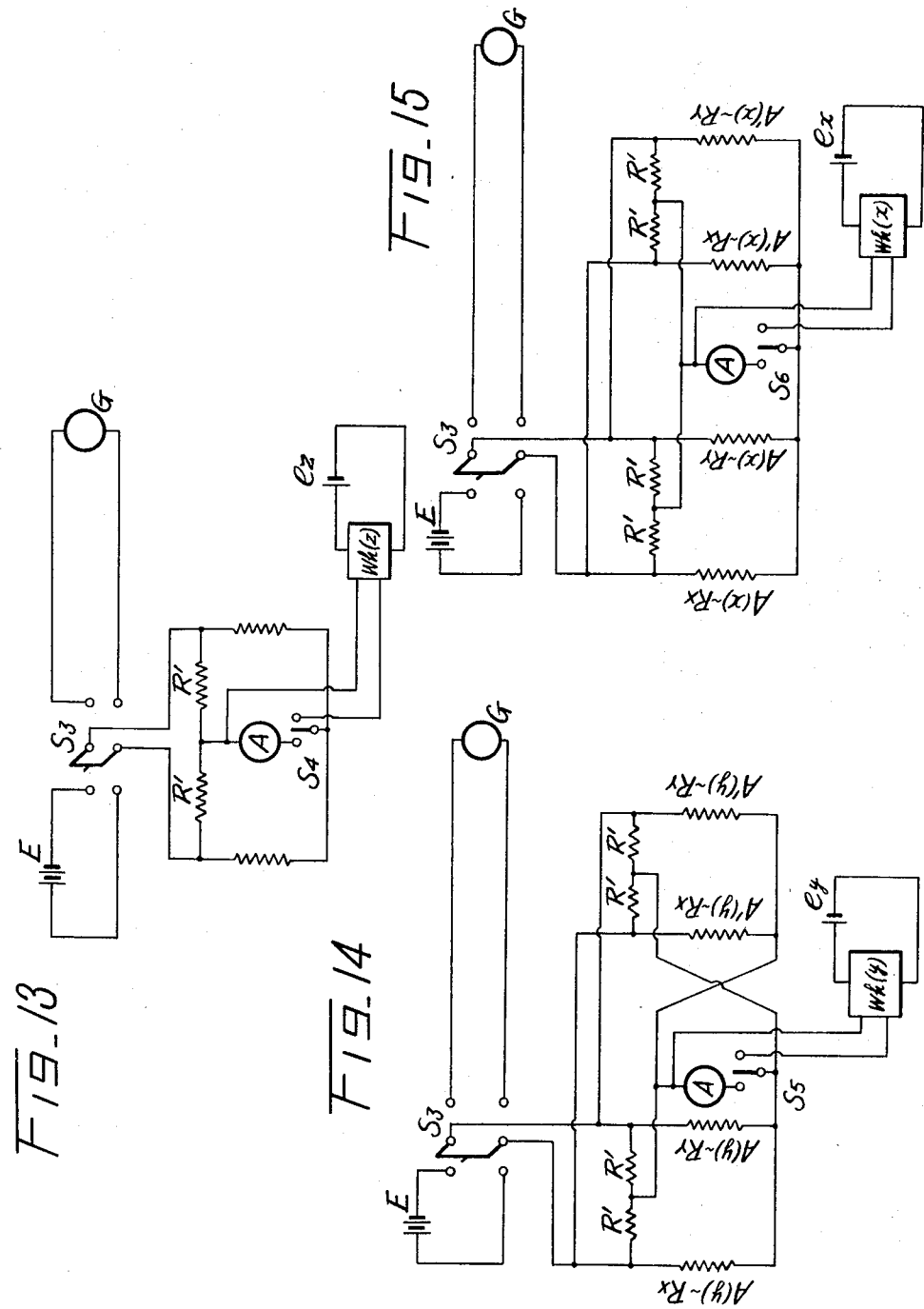

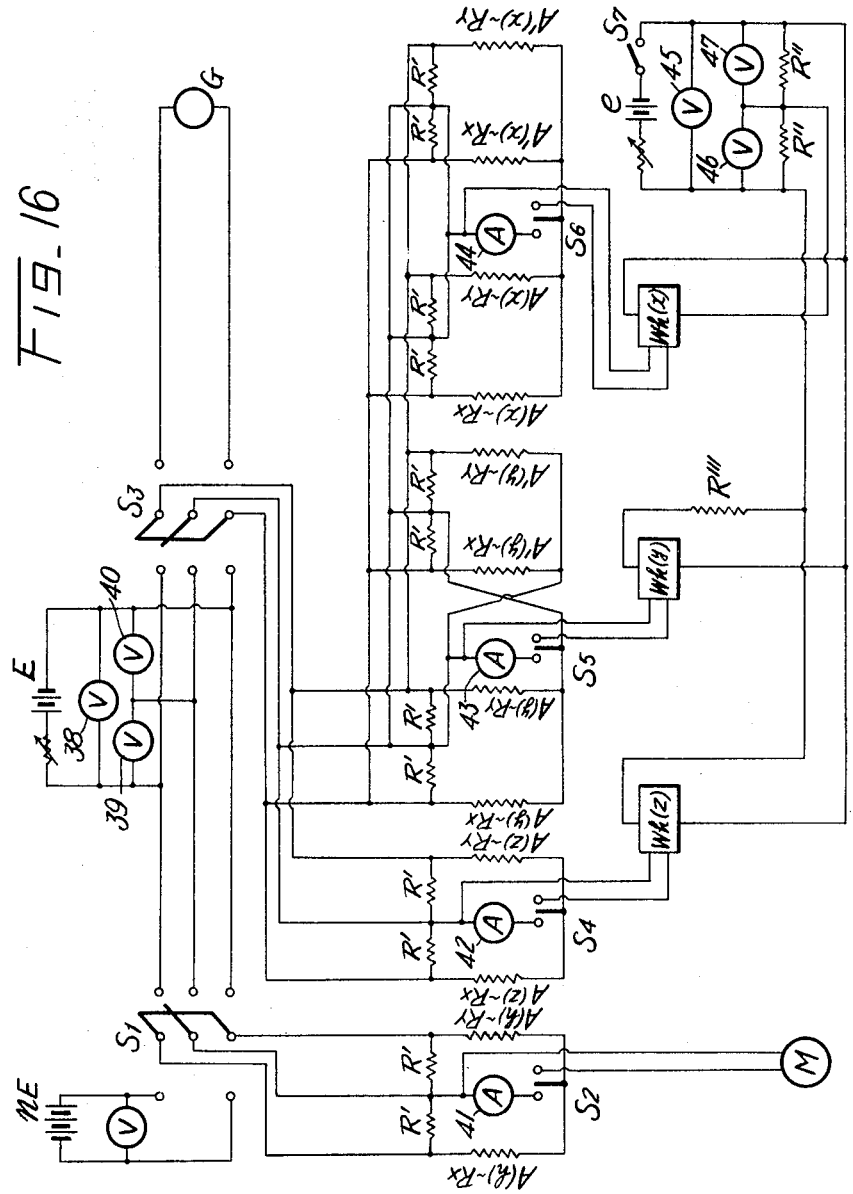

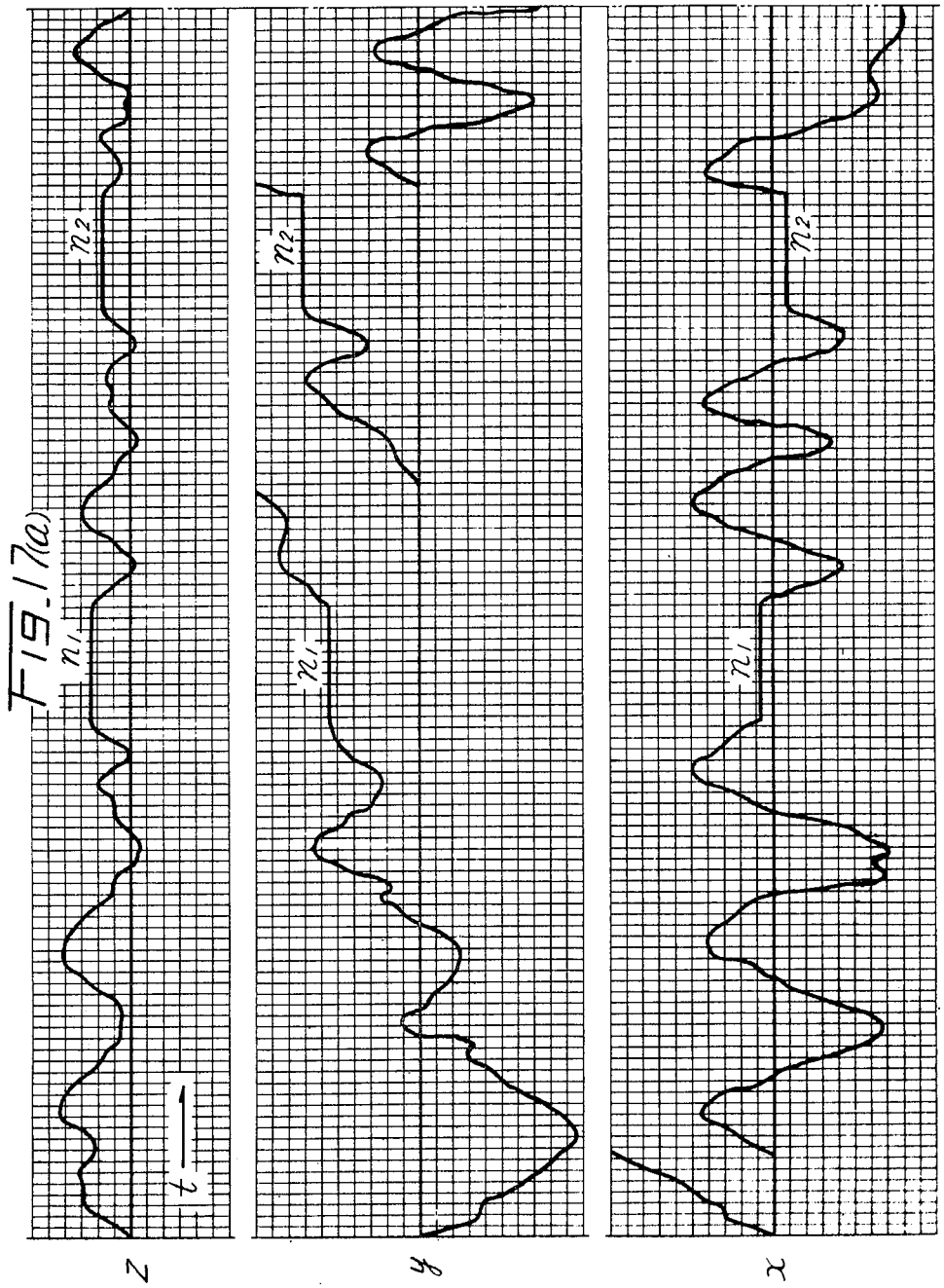

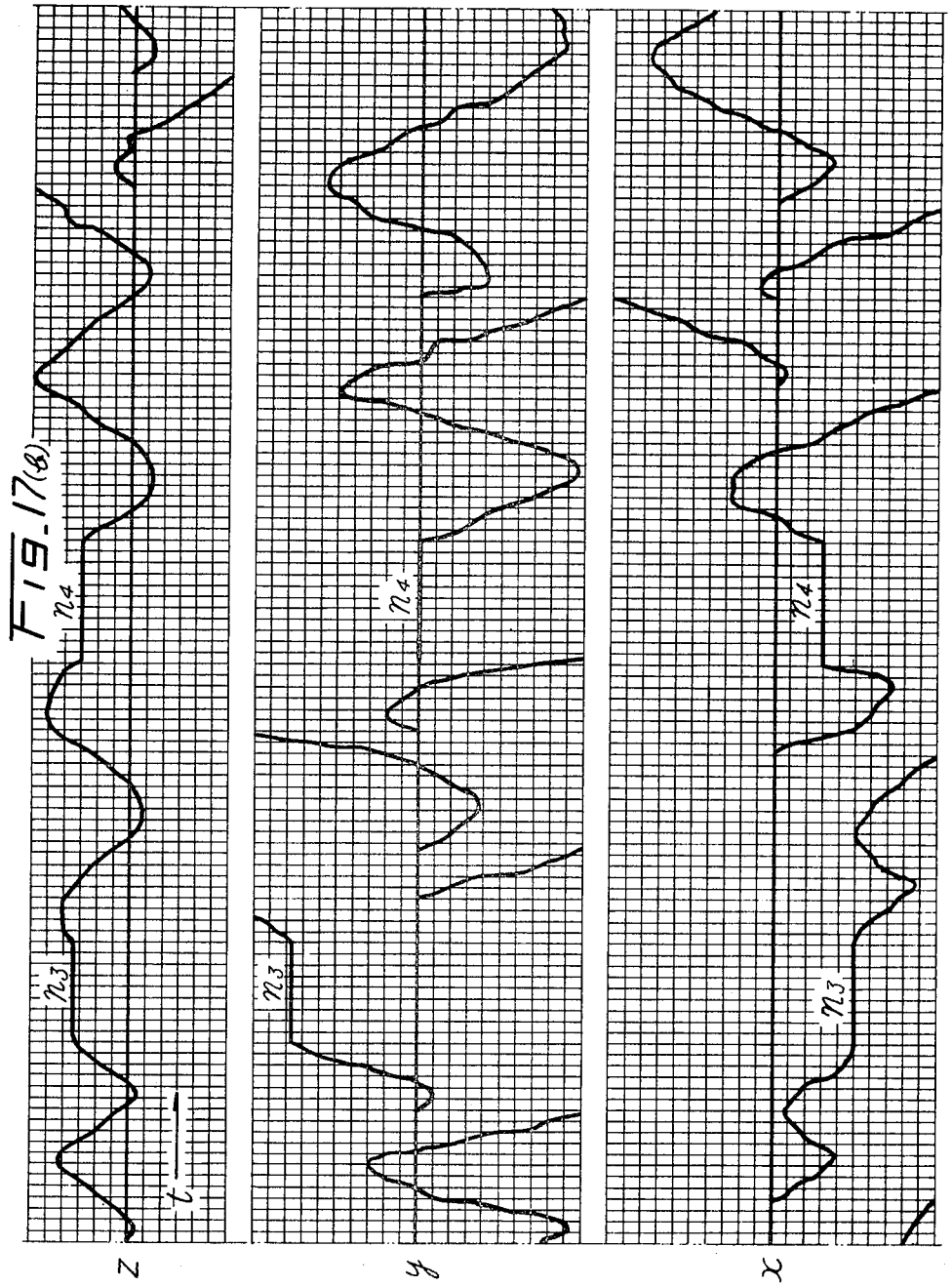

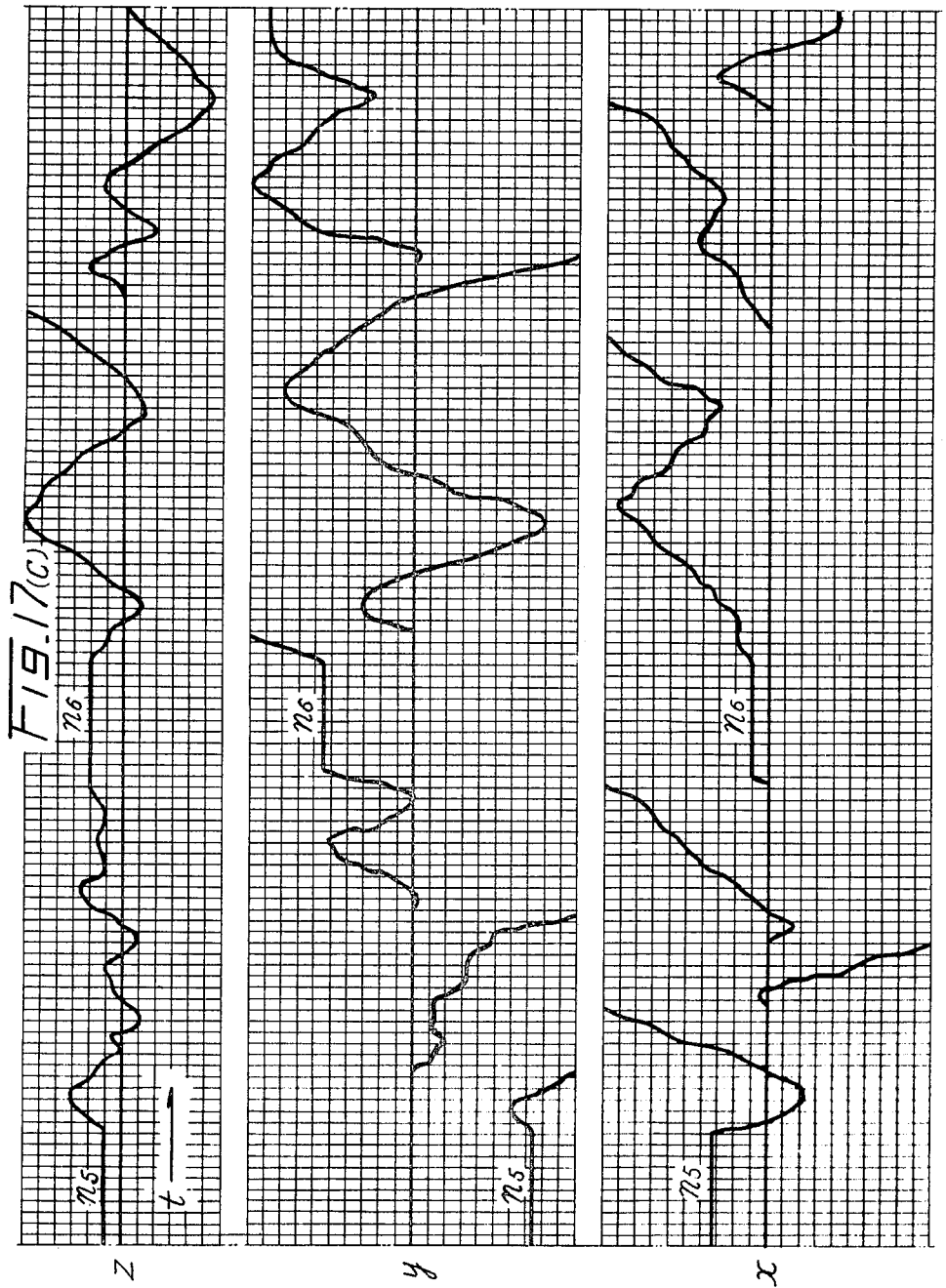

3,604,119

AUTOMATIC SURVEYING APPARATUS

BACKGROUND OF THE INVENTION

This invention relates to a surveying apparatus, and more particularly to an automatic surveying apparatus using liquid pressure levels for use in carrying out automatic surveying with the apparatus.

According to the prior art there are various types of land surveying such as triangulation, traverse surveying, topographic surveying, levelling, river surveying, route surveying, tunnel surveying, cadastral surveying, etc. Although these types of surveying are different in name, they are all similarly directed to determining the position of a point to be sought on the ground. Also, while these types of land surveying are methodologically different from one another depending on the range, topography and intended use of the area to be surveyed, they are all based on a common principle in which application is made of the trigonometry. Moreover, conventional types of surveying usually use optical means except those types using electromagnetic waves or light waves for triangulation or traverse surveying. None of can determine the same time the three elements of total latitude, total departure and difference of elevation which in turn determine the spatial position of a point of the ground. Furthermore, none of these conventional surveying methods has been successful in fulfilling the requirement for an automatic high-speed surveying operation which is more and more desired in present-day land surveying.

SUMMARY OF THE INVENTION

It is therefore an object of the present invention to provide a novel apparatus for land surveying in which use is made of electrical measuring means instead of optical means whereby three elements constituting the spatial position can be determined simultaneously to thereby enable an automatic and high-speed surveying operation to be achieved.

It is another object of the present invention to provide a novel-type liquid pressure level for use in the above-described apparatus for land surveying.

The automatic surveying apparatus using liquid pressure levels according to an aspect of the present invention comprises a plurality of liquid pressure levels secured in a predetermined manner on a controlled shaft mounted on a surveying vehicle along the longitudinal centerline thereof and on an adding shaft and a subtracting shaft both supported by said controlled shaft, said liquid pressure levels each consisting of a vessel containing liquid, pressure-sensitive electric resistances fitted to said vessel in predetermined positions thereof, and a basic electric circuit connected with said vessel and including said pressure-sensitive electric resistances among the components. The basic circuits are connected with a predetermined electric circuit, and an electromotive force from a departure-measuring generator is supplied to said predetermined circuit. The total latitude, total departure and difference of elevation are measured all at once by means of integrating meters, and recording means can be provided for recording the resultant measurements.

The liquid pressure level provided according to another aspect of the present invention comprises a vessel containing liquid, pressure-sensitive electric resistances fitted to said vessel in predetermined positions thereof, and a basic electric circuit connected with said vessel and including said pressure-sensitive electric resistances among the components thereof.

These and other objects and advantages of the present invention will now be described in greater detail with respect to the accompanying drawing showing a preferred embodiment of the invention, in which:

FIG. 3 is a plan view showing the construction of the liquid pressure level provided according to the present invention;

FIG. 4 is a cross-sectional view taken along line IV—IV of FIG. 3;

FIG. 5 is a cross-sectional view taken along line V—V of FIG. 3;

FIG. 6 is a view illustrating the construction of the pressure-sensitive electric resistance fitted to the liquid pressure level device of the present invention;

FIG. 7 is a diagram showing the basic electric circuit of the liquid pressure level according to the present invention;

FIG. 11 is a plan view illustrating the manner in which the azimuth is transmitted and the manner in which the liquid pressure level is installed;

FIG. 12 is a cross-sectional view taken along line XII—XII of FIG. 11;

FIG. 13 shows the electric circuit for measuring the difference of elevation 2;

FIG. 14 shows the composite electric circuit for measuring the total departure $y$;

FIG. 15 shows the composite electric circuit for measuring the total latitude $x$;

FIG. 16 illustrates the overall automatic surveying circuit used in carrying out the method of the present invention;

Figure 18:
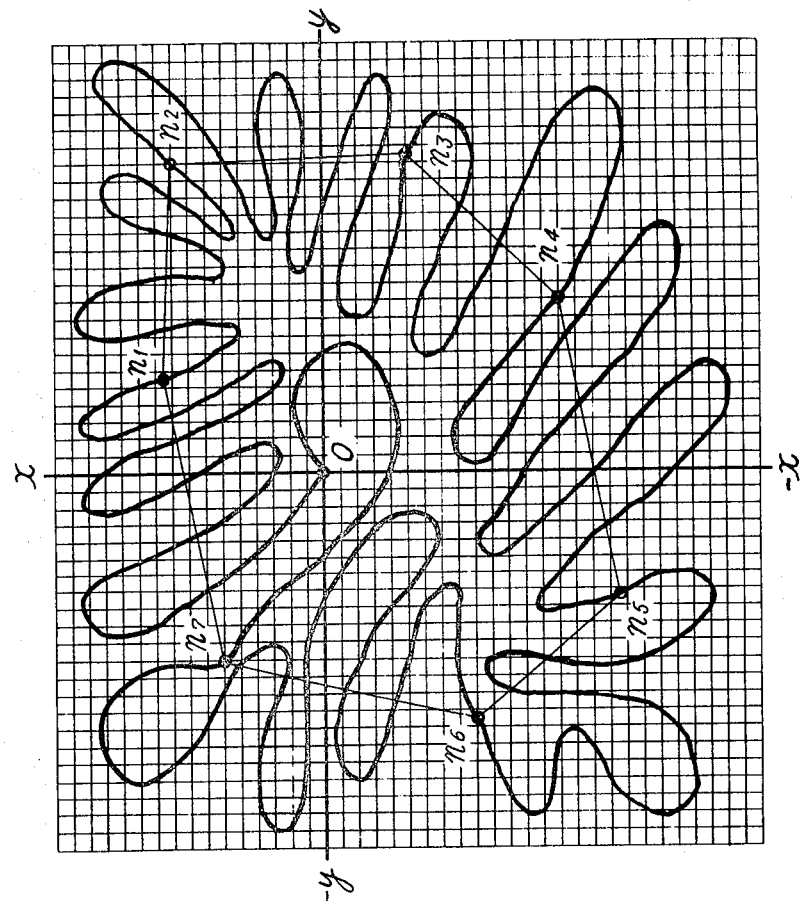
Figure 17D:
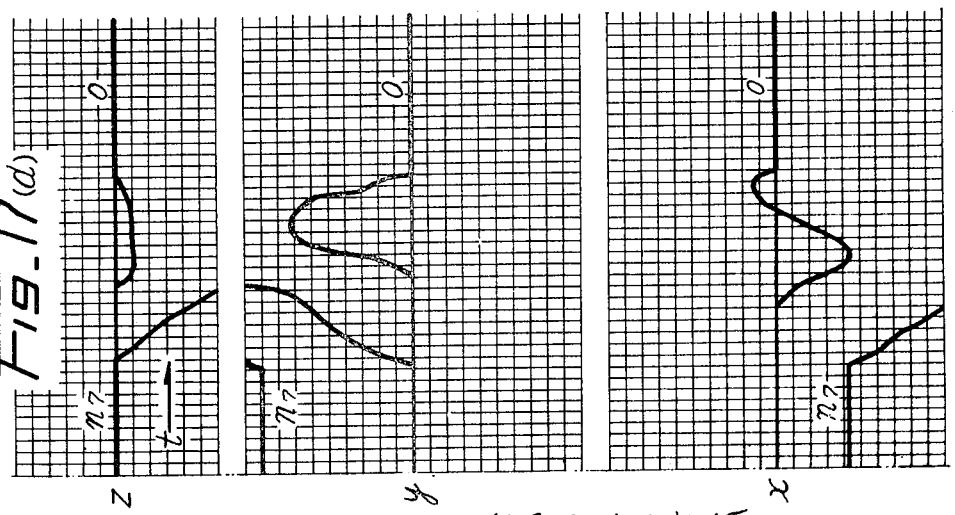
Figure 19:
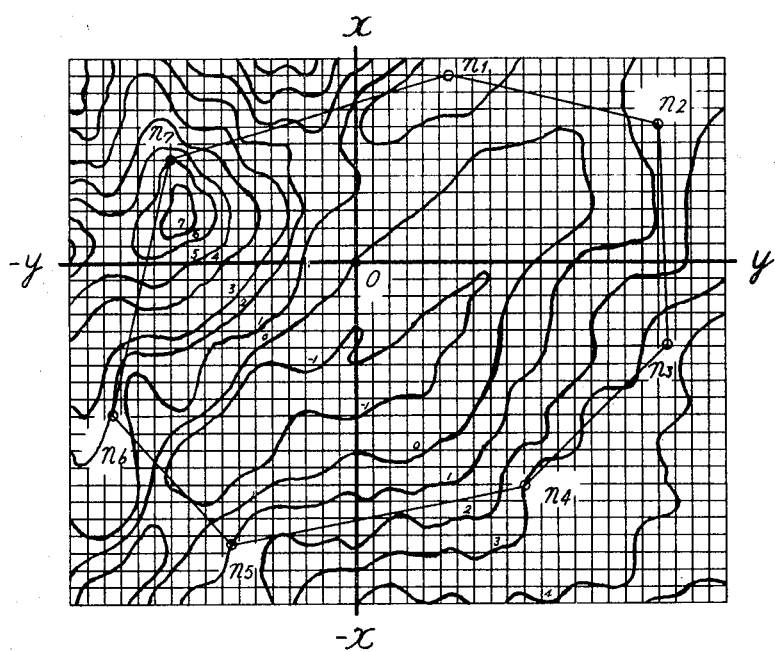

FIG. 17a, b, c, and d shows an example of the record achieved by integrating meters used with the present invention;

FIG. 18 shows the plannar coordinates as developed in accordance with said record; and FIG. 19 is a view showing a contour line map prepared in accordance with said record.

DESCRIPTION OF THE PREFERRED EMBODIMENT

In principle, surveying is a technical art for measuring and graphically showing the relative positions between points of the surface of the earth and providing points in predetermined projected positions. The spatial position of a point on the earth's surface may be determined by knowing the plannar position and elevation thereof. If stereoscopically rectangular coordinates are used to indicate the spatial position, and assuming that an arbitrary origin is 0 (0,0,0) and that any point to be sought is N (X,Y,Z), then the relative position may be determined by obtaining the respective coordinates X,Y and Z. It is here assumed that the axis X is taken in the direction of the true meridian, with north as the positive, and that the axis Y is taken in the east-west direction orthogonal to the true meridian, with east as the positive. It is also assumed that for a smaller area of the earth's surface, the plane formed by the axes X and Y is a flat plane and that for a greater range of the earth's surface, it is a spherical plane normal to the direction of the earth's gravity. It is further assumed that the axis Z is normal to said plane formed by the axes X and Y and that the opposite direction to the direction of the earth's gravity is positive. Hence, the coordinate X represents the total latitude, the coordinate Y the total departure and the coordinate Z the difference of elevation.

Figure 1:
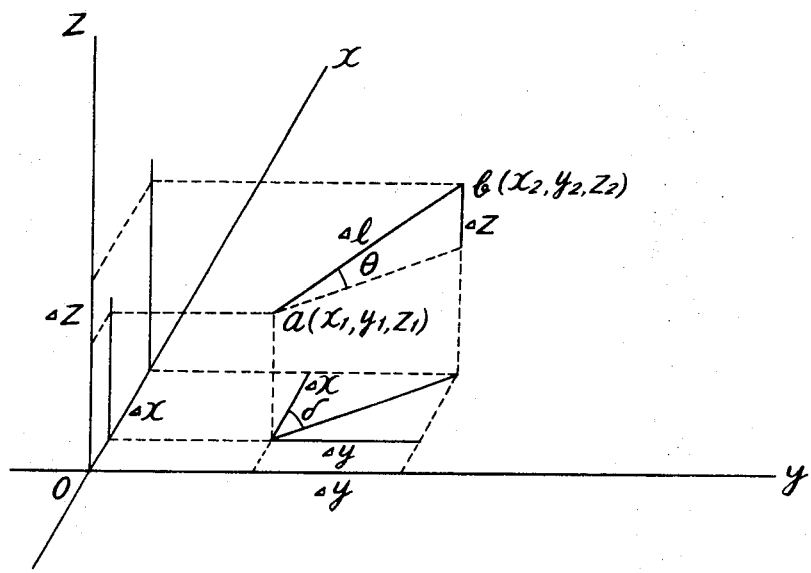
FIGS. 1 and 2 are views illustrating the relative positions between points of the ground in stereoscopically rectangular coordinates.

Referring now to FIG. 1 of the drawings, assume that the coordinates of the two points $a$ and $b$ on the earth's surface which are spaced apart a very small distance $\Delta l$ that may be regarded as a straight line are $a(x_1 y_1 z_1)$ and $b(x_2 y_2 z_2)$ respectively. Then the latitude $\Delta x$, departure $\Delta y$ and difference of elevation $\Delta z$ will be represented by the following equations respectively:

$$\Delta x = \Delta l \cdot \cos\theta \cdot \cos\delta \quad (1)$$
$$\Delta y = \Delta l \cdot \cos\theta \cdot \sin\delta \quad (2)$$
$$\Delta z = \Delta l \cdot \sin\theta \quad (3)$$

In the foregoing equations, $\theta$ is the angle formed by $\Delta l$ with respect to the horizontal plane, and with the angle of elevation as positive, and $\theta$ is hereinafter referred to as the "vertical angle."

$\delta$ is the horizontal angle formed by $\Delta l$ with respect to the positive direction of X-axis or the north direction of the true meridian, and with the clockwise direction as positive, and it is hereinafter referred to as "azimuth."

Figure 2:
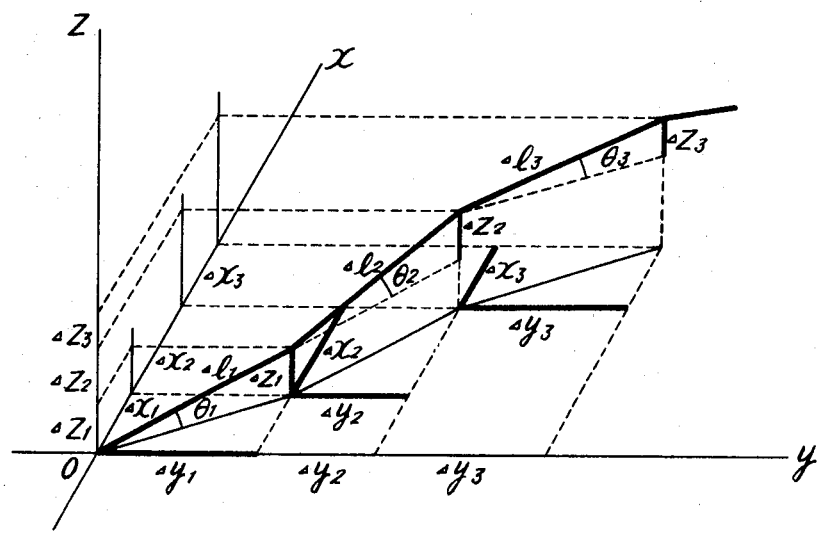

Thus, the total latitude $x$, total departure $y$ and difference of elevation $z$ from an arbitrary origin $O$ to an arbitrary station $N$ will be denoted by the following respective equations as will be seen in FIG. 2.

$x = \Delta x_1 + \Delta x_2 + \quad + \Delta x_n$
$= \Delta l_1 \cdot \cos\theta_1 \cdot \cos\delta_1 + \Delta l_2 \cdot \cos\theta_2 \cdot \cos\delta_2 + \quad + \Delta l_n \cdot \cos\delta_n \cdot \cos\delta_n$ $$= \sum_{j=1}^{n} \Delta l_j \cdot \cos\theta_j \cdot \cos\delta_j \quad (4)$$

$y = \Delta y_1 + \Delta y_2 + \quad + \Delta y_n$
$= \Delta l_1 \cdot \cos\theta_1 \cdot \sin\delta_1 + \Delta l_2 \cdot \cos\theta_2 \cdot \sin\delta_2 + \quad + l_n \cdot \cos\theta_n \cdot \sin\delta_n$ $$= \sum_{j=1}^{n} \Delta l_j \cdot \cos\theta_j \cdot \sin\delta_j \quad (5)$$

$z = \Delta z_1 + \Delta z_2 + \quad + \Delta z_n$
$= \Delta l_1 \cdot \sin\theta_1 + \Delta l_2 \cdot \sin\theta_2 + \quad + \Delta l_n \cdot \sin\theta_n$ $$= \sum_{j=1}^{n} \Delta l_j \cdot \sin\theta_j \quad (6)$$

In brief, the gist of the present invention lies in providing means for obtaining separately and simultaneously the momentary values of $\Delta l \cdot \sin\theta$, $\Delta l \cdot \cos\theta \cdot \sin\delta$ and $\Delta l \cdot \cos\theta \cdot \cos\delta$, automatically integrating (I) the difference of elevation $z$, (II) total departure $y$ and (III) total latitude $x$ to thereby enable the integrated values to be immediately read out at a point of ground to be sought, and recording the integrated values of the entire measuring process or providing each point of the ground as desired. There are five components indispensable to carry out the method and description will first be given of the construction, nature and principle of these components, which are (i) liquid pressure levels, (ii) automatic level controller, (iii) surveying vehicle and departure measuring generator, (iv) integrating meter and (v) means for transmission of azimuth displacement and means for mounting liquid pressure levels.

i. Liquid pressure levels

The levels used with the present invention are entirely different in construction, nature and effect from the conventional spirit levels as will be later described. In view of the fact that the variation in the total pressure imparted to the predetermined portion of a vessel by the liquid contained therewithin has a certain relationship with the rotational angle of the level of the vessel, the levels according to the present invention are adapted to convert said pressure variation into electric resistance variation so as to enable the vertical angle to be indicated by an ammeter, and each of the levels according to the present invention comprises (a) a vessel containing liquid, (b) pressure-sensitive electric resistances mounted at predetermined locations on the opposite sides of said vessel, and (c) a basic electric circuit connected with said electric resistances. The level device described above is hereinafter referred to as a "liquid pressure level."

Description will be given of the elements forming the liquid pressure level.

a. Vessel

FIG. 3 shows a plan view of the vessel of the liquid pressure level according to the present invention. FIGS. 4 and 5 show cross sections thereof taken along lines IV—IV and V—V of FIG. 3, respectively.

As shown in FIGS. 3, 4, and 5, an annular tube 1 having an inner diameter $d$ is formed into an annular vessel 2 having a diameter $D$ with O as the center thereof. The annular vessel 2 thus formed has the shape of a hollow doughnut. Liquid 4 having a density $p$ is poured into the hollow portion of said vessel in such a manner that a single small bubble 3 is provided within the vessel now filled with the liquid.

The annular vessel 2 is fixed at the center O thereof to a shaft 5 so that the vessel is normal with respect to the shaft. When the shaft 5 is brought into accord with the horizontal plane, the bubble 3 comes up to the uppermost end of the vessel 2 and thus the vertical distance of the bubble from the horizontal plane passing the center O of the vessel will become $D/2$. As long as the shaft 5 remains in accord with the horizontal plane, rotation of the shaft 5 and accordingly of the vessel 2 would not change the position of the bubble 3 from the uppermost end of the vessel therewithin, whereby the vertical distance of the bubble from the horizontal plane will be maintained at $D/2$ at all times.

With reference to FIG. 4, consideration will now be given to the points X and Y at which the diameter passing the center O of the vessel intersects the inner wall of the vessel. The points X and Y are positioned symmetrically with respect to the center O. Suppose new small planes X and Y about the respective points X and Y and assume that the area of each of these planes X and Y is $a$. If the straight line XY which connects the points X and Y is in coincidence with the horizontal line passing the center O, the total pressures of the liquid imparted to the planes X and Y are equal independently of the direction of the planes. If the total pressure of the liquid is $W$, and the gravity constant is $g$, then the following equation is obtained:

$$W = \tfrac{1}{2} D \cdot a \cdot p \cdot g \text{ (dynes)}$$

Next, explanation will be made of the total liquid pressures imparted to the plane X or Y when the line XY is brought into a position at rotational angle $\alpha$ with respect to the horizontal line. (As regards $\alpha$, the clockwise rotation as viewed in FIG. 4 is the positive direction.) The total liquid pressure decreases in the plane X while it increases in the plane Y in inverse proportion. Assuming that the amount of total pressure variation is $\omega$, then $$\omega = (D/2) \cdot a \cdot p \cdot \sin\alpha \quad (7)$$

The values of $D$, $a$ and $p$ can be determined by determining the size of the vessel, the dimensions of the planes X and Y and the kind of the liquid respectively, while the gravity constant $g$ is known, and therefore, if $k_1$ is the proportion constant, there is obtained the following equation:

$$\omega = k_1 \cdot \sin\alpha \quad (8)$$

Thus it will be appreciated that the amount of variation in the total liquid pressure applied in the planes X and Y is in proportion to the sine of the rotational angle.

Here, as will be readily seen from the equation (7), the inner diameter of the tube 1 has nothing to do with the amount of variation in the liquid pressure and therefore the value of $d$ also has nothing to do with the vessel of the present invention. Thus, if $d$ equals $D/2$, the shape of the vessel will be spherical. Consequently, the vessel can be of any shape in which the vertical distance from the rotating shaft 5 to the liquid surface is $d/2$. Such a vessel is hereinafter referred to as "vessel."

b. Pressure-sensitive electric resistances

As shown in FIG. 6, an opening which is somewhat larger than area $a$ is provided to extend through the sidewalls of the vessel at each of the diametrically opposite portions thereof or in each of the planes X and Y, and in said opening is fitted a pressure-sensitive electric resistance which will later be described. The fitting of the pressure-sensitive electric resistance in said opening is achieved by screwing a cylindrical member 6 of electrically nonconductive material having an externally threaded end portion into said opening which has its periphery complementally threaded so as to ensure a fluid-tight seal to be formed to prevent any leakage of the liquid contained within the vessel.

A thin sheet 7 made of electrically conductive material such as metal or the like is mounted across the externally threaded end of said cylindrical member 6 and adapted to move like bellows in the direction of XY. The movement of said thin sheet 7 is limited to the range of the area indicated by $a$, and it transmits the pressure variation of the liquid 4 within the vessel. Particles of electrically conductive material 8 such as carbon or the like are contained in a tubular member 10 of nonconductive material which is disposed within the cylindrical member 6. A pistonlike member 7a on the thin sheet 7 extends into tubular member 10 and bears against conductive material 8. Said conductive material 8 in particle form senses any pressure variation of the liquid 4 through said movement of said thin sheet of metal 7. A convexly curved plate 9 made of metal or like conductive material is secured to close the other end of said tubular member 10. As will be appreciated, the thin sheet metal 7, pistonlike member 7a particles of conductive material 8 and curved plate 9 together form a kind of DC resistance.

The electric resistance thus provided in the plane X is indicated by $Rx$ and that provided in the plane Y is denoted by $Ry$. Since it is generally known to those skilled in the art that a DC resistance formed of solid material or an assembly of solid materials generally varies negatively or positively in proportion to the positive or negative variation of the pressure, if the amount of variation in electric resistance is $r$ and the proportion constant is $k_2$, a relation such as $r=k_2$ will be obtained. Therefore, if adjustment is made to obtain the relation of $Rx=Ry=R$ at the time when the line $XY$ is brought into accord with the horizontal line, then relations such as $Rx=R+r$, and $Ry=R-r$ will be obtained in the case where XY is brought into a rotational angle $\alpha$ with respect to the horizontal line. Thus, there is derived the following equation from the equation (8):

$$r=k_1 \cdot k_2 \cdot \sin\alpha \quad (9)$$

The particular electric resistance described just above is one which is usually used with microphones or telephone sets, but DC resistances of any material and structure that can achieve a proportional variation with respect to pressure variation may be used with the present invention, and such resistance is hereinafter referred to as a "pressure-sensitive electric resistance."

c. Basic electric circuit

An electric circuit as shown in FIG. 7 includes the above-described two pressure-sensitive electric resistances as the components thereof. In this case, if XY is in accord with the horizontal line, the relationship is such that $Rx=Ry=R$. Therefore, assuming that the current passing through a DC ammeter inserted between A and B is I, the value of I will be zero which means that the meter will detect no current passing therethrough. For convenience of description, now assume that the current passing from A to B is positive. However, in view of the fact that a negative current may pass through this ammeter, the ammeter is provided with a needle which is capable of indicating both positive and negative currents. When XY forms a rotational angle $\alpha$ with respect to the horizontal line, the current I passing through the ammeter may be calculated by Kirchhoff's law with the following result:

$$I=\frac{E \cdot r}{R^2+RR'-r^2}$$

where the internal resistance of the ammeter is neglected because it is generally extremely small. Since the value of $r^2$ is usually very small as compared with that of $(R^2+RR')$, it is possible to consider $r^2=0$. Hence, $$I=\frac{E \cdot r}{R^2+RR'} \quad (10)$$

The values of $R$ and $R'$ can be obtained by determining the material, shape, size and other factors of the resistance. Therefore, if $k_3=1/(R^2+RR')$, the current I will be represented as follows:

$$I=k_3 \cdot E \cdot r$$

Thus, there is obtained from the equation (9):

$$I=k_1 \cdot k_2 \cdot k_3 \cdot E \sin\alpha$$

When $k=k_1 \cdot k_2 \cdot k_3$, the foregoing equation will become thus:

$$I=k \cdot E \sin\alpha \quad (11)$$

It will thus be seen that the current passing through the DC ammeter interposed between A and B is proportional to the sine of the rotational angle. This means that the rotational angle can be known by providing the ammeter with positive and negative sine scales. Such a circuit as shown in FIG. 7 is hereinafter referred to the "basic electric circuit."

In the automatic surveying apparatus, which is to be discussed, there are used six of the same liquid pressure levels as described above, which will be indicated by their respective reference symbols.

The symbol $A(h)$ represents a liquid pressure level used for the automatic level controller which is to be described. $A(z)$ denotes the level for measuring the difference of elevation $z$, $A(y)$ and $A'(y)$ two liquid pressure levels used for measuring the total departure $y$, and $A(x)$ and $A'(x)$ two levels for measuring the total latitude $x$.

ii. Automatic level controller

Generally the surface of the earth abounds with undulations, which may eventually cause the body of a surveying vehicle fixed along the longitudinal centerline thereof to be inclined rightwardly or leftwardly even if the vehicle is of a four-wheel type as will be later described.

Figure 8:
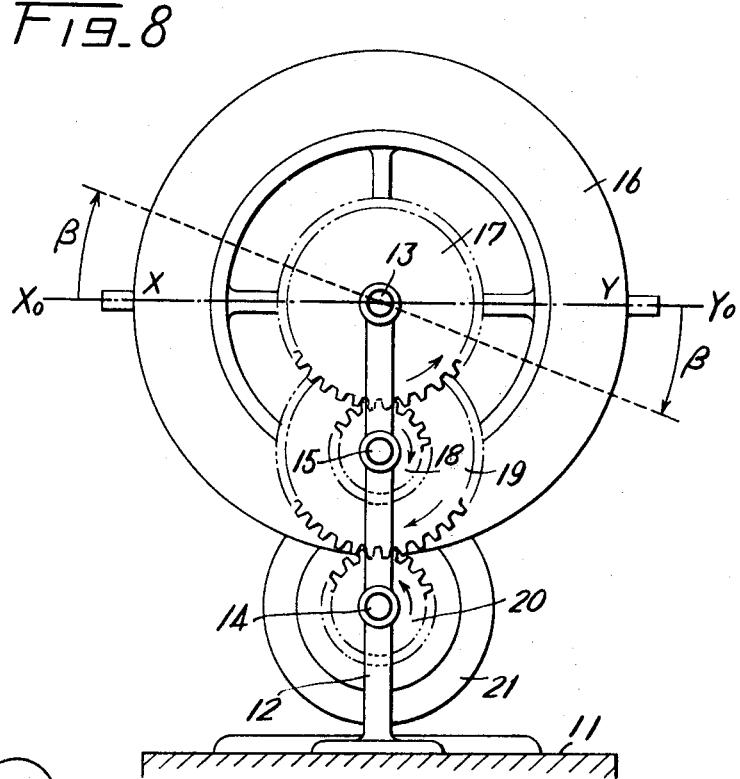
FIG. 8 is a rear view of the right and left automatic level controller used with the liquid pressure level according to the present invention.
Figure 9:
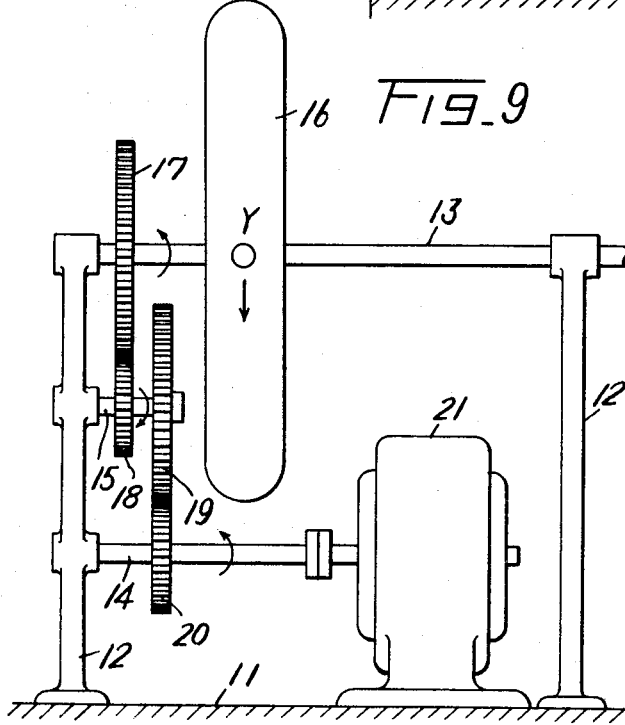
FIG. 9 is a right-hand side view thereof.

FIG. 8 is a rear view of the automatic level controller mounted on a surveying vehicle along the longitudinal centerline thereof. FIG. 9 is a view of the same controller as viewed from the right-hand side thereof. Both these figures are for the purpose of illustrating said automatic controller.

In these figures the reference numeral 11 denotes a portion of the body of the surveying vehicle along the longitudinal centerline thereof. It is natural that said body should be inclined rightwardly, leftwardly, back or forth in accordance with the similar inclination of the vehicle itself.

Vertically fixed on said body portion 11 are metallic support members 12 having bearings for smoothly supporting a plurality of rotating shafts 13, 14 and 15. The rotating shaft 13 is journaled to the metallic support member 12 by means of the bearing provided thereon. The numeral 16 refers to the above-mentioned liquid pressure level $A(h)$, which is secured at its center to said rotating shaft 13 in such a manner that XY is in accord with the horizontal while being normal to the rotating shaft 13. A gear 17 is also fixed on said rotating shaft 13 for engagement with a second gear 18 fixed on the rotating shaft 15 which in turn has a third gear 19 fixed thereon and spaced apart from said second gear 18. The gear 19 engages a fourth gear 20 fixed on the rotating shaft 14 which is directly connected to the rotating shaft of a motor 21.

Figure 10:
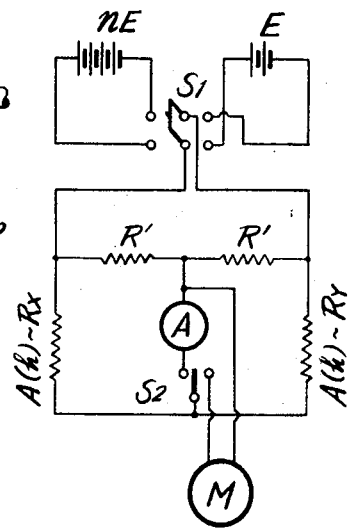
FIG. 10 is a diagram of the electric circuit thereof.

The arrangement as shown in FIGS. 8 and 9 has connected thereto a basic electric circuit of the liquid pressure level as shown in FIG. 10. In FIG. 10, $A(h)$-$Rx$ means the pressure-sensitive electric resistance $Rx$ of the liquid pressure level $A(h)$. A similar designation is used in FIGS. 13 through 16. Throwing a switch $S_1$ to the $nE$ side causes the voltage of E to be increased, and throwing a switch $S_2$ to the M side enables the switchover to a DC motor adapted to rotate in response to a positive or negative current, instead of to the ammeter of the circuit.

In FIG. 8, when the body 11 of the surveying vehicle is inclined clockwise by an angle $\beta$, the metallic support member 12 is also inclined by the angle $\beta$ at the same time. Thereupon, assume that the liquid pressure level $A(h)$ 16 secured on the rotating shaft 13 is also inclined by the same degree $\beta$. Then there will be passing through the motor inserted in said basic electric circuit a current of $I=k \cdot nE \sin\beta$ as seen from the equation (11), which causes the motor to start rotation. The rotation of the motor is transmitted through the gearing mechanism to rotate the shaft 13 counterclockwise to thereby cause the XY of the liquid pressure level $A(h)$ to approach the horizontal line. When XY is brought into accord with the horizontal line, the current $I$ passing through the basic electric circuit becomes zero and the rotation of the motor stops. As a result, the shaft 13 on which $A(h)$ is secured assumes the horizontal position.

When the body 11 is inclined counterclockwise by $(-\beta)$, $I=k \cdot nE \sin(-\beta)=-k \cdot nE \sin\beta$ with the result that the motor rotates in the opposite direction to cause the gearing mechanism also to move in the opposite direction, whereby $A(h)$ and the shaft 13 return to the horizontal position.

Actually, however, the motor does not start rotation only after the body 11 is inclined by $\beta$, but rather the current starts to flow and to rotate the motor when the body 11 begins to be inclined, and thereupon the liquid pressure level $A(h)$ is subjected to a force which acts to return the liquid pressure level to the horizontal. Therefore, in case the body 11 is inclined at a normal speed, little or no inclination of $A(h)$ takes place, and even if the body 11 is rapidly inclined, $A(h)$ will immediately return to the horizontal position.

As described above, the current passing through the motor is represented by $I=k \cdot n E \cdot \sin \beta$. Therefore, due to the nature of $\sin \beta$, the greater the degree of inclination of the body 11, the greater the speed at which the body returns to the horizontal position, and the speed becomes lower as the body comes closer to the horizontal position. It will be seen that the operation is a very smooth one. If $A(h)$ is caused to return beyond the horizontal position by the rotation of the motor, a current acting to rotate the motor in the opposite direction will pass through the motor, which means that there is at the same time a force acting to control the inertia of the motor rotation.

The use of larger gears 17 and 19 and small gears 18 and 20 is to provide a greater ratio of rotation between the motor and the liquid pressure level $A(h)$.

With the above-described arrangement, the rotating shaft 13 and the other shafts mounted thereon maintain the right and left horizontal positions, so that all the other liquid pressure levels for automatic surveying which will later be discussed will be free of the effect resulting from any rightward or leftward inclination of the body 11. Such arrangement is hereinafter called the "automatic level controller," and the rotating shaft 13 is referred to as the "controlled shaft" in the sense that it is a shaft whose right and left horizontal line is controlled.

iii. Surveying vehicle and departure-measuring generator

The surveying vehicle is a vehicle having wheels which roll on the surface of the ground and it carries thereon all the apparatus for carrying out the method of the present invention. The surveying vehicle may be of the self-travelling type operable by a direct or remote control system or of the type which is drawn by any tractor means movable on the ground. When the surveying vehicle travels on the ground the body mounted on the vehicle along the longitudinal centerline thereof is inclined back and forth in accordance with the undulations of the earth's surface. Such back and forth inclination of the vehicle body is referred to as the "angle of inclination," which corresponds to the vertical angle $\theta$ shown in FIGS. 1 and 2. The departure-measuring generator is a DC generator the armature of which is rotated in proportion to the number of rotations of the wheels by means of a gear secured on the center of the wheel shaft. In this case, the electromotive force of the generator is made proportionate to the speed of rotation of the armature by determining the total number of the conductors in the armature windings and the number of effective magnetic fluxes in the generator. The speed of rotation of the armature is proportionate to the speed of rotation of the surveying vehicle's wheels, which in turn is proportionate to the speed of travel of the surveying vehicle. Hence, if the distance that the surveying vehicle has travelled is $\Delta l$, the time required for this travel is $\Delta t$, the electromotive force of the generator is $E'$ and the proportion constant is $k_4$, then $$E'=k_4 \cdot (\Delta l/\Delta t) \quad (12)$$

iv. Integrating meter

This is a DC power-integrating meter which is operable in response to positive and negative currents. It is mounted on the surveying vehicle at any desired location. If the DC voltage of the integrating meter is $e$, the current thereof is $I$, the time during which the current passes is $\Delta t$, and the proportion constant is $k_5$, the output $\Delta f$ of the integrating meter is represented as below:

$$\Delta f = k_5 \cdot e \cdot I \cdot \Delta t \quad (13)$$

This integrating meter is designed so that the integrated quantity obtained thereby can be immediately read out as a numerical value or scale at any arbitrary point on the ground and that a recording needle is provided to successively record the value at each moment on a paper sheet attached onto a cylindrical member rotating at uniform speed. The device as described just above is hereinafter referred to as an "integrating meter." In the automatic surveying apparatus which is to be described, there are used three such integrating meters, namely, one designated $Wh(z)$ for measuring the difference of elevation $z$, one designated $Wh(y)$ for measuring the total departure $y$ and one designated $Wh(x)$ for measuring the total latitude $x$.

v. Means for transmitting azimuth displacement and means for mounting liquid pressure levels FIGS. 11 and 12 illustrate an example of the relationship among the gyrocompass, the gearing mechanism transmitting the azimuth displacement and a set of shafts for mounting the liquid pressure levels, FIG. 11 being a plan view and FIG. 12 being a cross-sectional view taken along line XII—XII of FIG. 11.

The gyrocompass has a rotating member 22 which is electrically driven. The rotating member 22 has a central shaft 23 which is always directed along the north direction of the true meridian and the front and rear ends thereof are smoothly supported by a frame member 24, which is smoothly slidable within an outer frame member 25 whereby the frame member 24 is kept free from the effect resulting from the effect resulting from any inclination of the body 11 of the surveying vehicle. Supporting rods 26 and 27 are fixed to said outer frame member 25 and they are positioned vertically with respect to the central shaft 23 of the rotating member. These supporting rods have their respective free ends received by metallic receiving members 28 and 29 inwardly projected from the body 11, in such a manner that the rotating member is supported with respect to said body 11 without friction between the supporting rods and the body 11. A bevel gear 30 secured on the supporting rod 27 and an associated bevel gear 31 secured on a shaft 32, which have the same configuration and size, are exactly complementary to each other, whereby when the longitudinal centerline of the surveying vehicle is directed along the direction of the azimuth $\delta$, the bevel gear 31 eventually rotates through angle $\delta$ and accordingly the shaft 32 also rotates through angle $\delta$. The shaft 32 is for transmitting angular variation of the azimuth $\delta$, and therefore this shaft is hereinafter referred to as the "transmission shaft." This transmission shaft extends through said controlled shaft 13 along the axial center thereof and is connected to shafts 36 and 37 through bevel gears 33, 34 and 35 which have the same configuration and size.

Said shafts 36 and 37 are supported normal to the controlled shaft 13, whereby any rightward or leftward inclination may be automatically controlled so as to enable the shafts 36 and 37 to be always maintained horizontal. For an angle of inclination $\theta$, these latter shafts incline together with the controlled shaft 13. Furthermore, the shaft 36 is rotated through angle $\delta$ in the positive direction of $\theta$ by the bevel gears 33 and 34, while the shaft 37 is rotated through angle $\theta$ in the negative direction of $\theta$ by the bevel gears 33 and 35. Said shaft 36 is hereinafter referred to as the "adding shaft" in the sense that an azimuth is added to an angle of inclination, while the shaft 37 is referred to as the "subtracting shaft" in the sense that an azimuth is subtracted from an angle of inclination.

The controlled shaft 13, the adding shaft 36 and the subtracting shaft 37 are all brought into accord with the horizontal plane, and thereafter the liquid pressure levels to be mounted, while being disposed in their respective central positions and vertically with respect to the horizontal plane, are secured to their respective shafts in the following manner.

The liquid pressure level $A(h)$ is disposed normal to the controlled shaft, while the liquid pressure level $A(z)$ is disposed parallel to the controlled shaft. In both levels $A(h)$ and $A(z)$, XY is brought into accord with the horizontal plane, and X of $A(z)$ is directed toward the front of the surveying vehicle.

The liquid pressure levels $A(y)$ and $A(x)$ are disposed normal to the adding shaft, while the liquid pressure levels $A'(y)$ and $A'(x)$ are disposed normal to the subtracting shaft. XY of $A(y)$ and that of $A'(y)$ are brought into accord with the horizontal plane, with their respective X's being directed toward the front of the surveying vehicle. XY of $A(x)$ and that of $A'(x)$ are disposed perpendicular to the horizontal plane, with their respective X's being in the lowest position. All these conditions will be summarized in the table below.

| Purpose | Liquid pressure level | Mounting shaft | Direction with respect to the longitudinal center line of surveying vehicle | Relation between XY and horizontal plane | Position of X |
|---|---|---|---|---|---|
| Right and left automatic level control | A($h$) | Controlled shaft | Normal | Accord | Left end. |
| Measurement of difference of elevation $z$ | A($z$) | do | Parallel | do | Front end. |
| Measurement of total departure $y$ | A($y$) | Adding shaft | do | do | Do. |
| | A'($y$) | Subtracting shaft | do | do | Do. |
| Measurement of total latitude $x$ | A($x$) | Adding shaft | do | Vertical | Lowest end. |
| | A'($x$) | Subtracting shaft | do | do | Do. |

A detailed description will be given of the effects of the present invention.

I. Measurement of difference of elevation $z$

Suppose there is a moment when the surveying vehicle is about to reach a point where the vertical angle of the earth's surface is $\theta$. Then the control shaft is longitudinally inclined by $\theta$ and the rotational angle of the liquid pressure level A($z$) secured parallel to the control shaft is also $\theta$. If a current $I_z$ is passing at this time through the ammeter of the basic electric circuit in the liquid pressure level A($z$), the following equation will be obtained from the equation (11).

$$I_z = k \cdot E \cdot \sin\theta$$

In FIG. 13, when a switch $S_3$ is thrown to the G side, $E$ will be eliminated from this circuit and replaced by the electromotive force $E'$ of the generator G. If, at this moment, the surveying vehicle has travelled a distance $\Delta l$ and the time required therefor is $\Delta t$, since the equation (12) gives $E' = k_4 \cdot (\Delta l / \Delta t)$, $$I_z = k \cdot k_4 \cdot (\Delta L / \Delta t) \cdot \sin\theta$$

By throwing switch $S_4$ to the W$h$($z$) side, the current $I_z$ is passed through the current circuit of an integrating wattmeter W$h$($z$). In this case, if the output of W$h$($z$) is $\Delta f_z$, the equation (13) gives $\Delta f_z = k_5 \cdot e_z \cdot I_z \cdot \Delta t$, and therefore, $$\Delta f_z = k \cdot k_4 \cdot k_5 \cdot e_z \cdot \Delta l \cdot \sin\theta$$

If a voltage of an appropriate value, that is, $$e_z = 1/(k \cdot k_4 \cdot k_5) \quad (14)$$

is previously applied to W$h$($z$) as a constant voltage $e_z$, then $$\Delta f_z = \Delta l \cdot \sin\theta \quad (15)$$

If the surveying vehicle continues to travel, the integrated quantity $f_z$ of the integrating wattmeter W$h$($z$) will become as follows:

$$f_z = \Delta l_1 \cdot \sin\theta_1 + \Delta l_2 \cdot \sin\theta_2 + \cdots + \Delta l_n \cdot \sin\theta_n$$

$$= \sum_{j=1}^{n} \Delta l_j \cdot \sin\theta_j$$

From the equation (6) there is obtained the following relation:

$$f_z = z$$

Thus, the integrated quantity $f_z$ represents the difference of elevation $z$. If a predetermined point of the surveying vehicle was at an arbitrary origin $0(0,0,0)$ at the time when the surveying operation was started, the difference of elevation at an arbitrary point N on the ground is the integrated quantity $f_z$ obtained by W$h$($z$) when said predetermined point of the surveying vehicle is at N.

Although the surface of the earth generally abounds with undulations as has already been mentioned, there is little or no place where the vertical angle $\theta$ exceeds the range of $-(\pi/2)$ $\theta < (\pi/2)$. Even if there is such a place it is unnecessary for the surviving vehicle to dare to travel beyond the range of $-(\pi/a') < \theta < (\pi/2)$ since the integrated value has nothing to do with the distance of travel of the surveying vehicle as is evident from the principle of the present invention. Generally the vertical angle varies at all times and assumes either positive (+) or negative (−) values and similarly the value of $\sin\theta$ may become either of positive and negative. In addition, the surveying vehicle moves not only forward but sometimes backward, and therefore the direction of rotation of the armature and consequently the electromotive force of the generator also assume either positive or negative values. As a result, the current passing through the integrating meter and the $\Delta z$ resulting from the integrating may also assume either positive or negative values. All these may be shown in brief by the following table.

| Earth's surface | Surveying vehicle | Angle of inclination ($\theta$) and its sine ($\sin\theta$) | Direction of rotation of armature and electromotive force ($E'$) | Current passing through integrating meter ($I_z$) | Movement of the scale of integrating meter ($\Delta z$) |
|---|---|---|---|---|---|
| Upward | Forward | + | + | + | Addition. |
| Do | Backward | + | − | − | Subtraction. |
| Downward | Forward | − | + | − | Do. |
| Do | Backward | − | − | + | Addition. |

II. Measurement of total departure $y$

Suppose there is a moment when the surveying vehicle is about to reach a point where the vertical angle of the earth's surface is $\theta$ and the longitudinal centerline of the surveying vehicle is directed in the direction of $\delta$. Then the controlled shaft is longitudinally inclined by $\theta$ and the transmission shaft rotates by $\delta$. This means that the adding shaft rotates by $(\theta+\delta)$ and the subtracting shaft by $(\theta-\delta)$. Accordingly the liquid pressure level A($y$) secured to the adding shaft rotates by $(\theta+\delta)$ and the liquid pressure level A'($y$) secured to the subtracting shaft rotates by $(\theta-\delta)$.

If the basic electric circuit for A($y$) and that for A'($y$) are coupled together as shown in FIG. 14, $Iy$ which is the current passing through the ammeter of this composite circuit will become as follows from a calculation according to Kirchhoff's law:

$$Iy = \frac{E(r_1 - r_2)}{2R^2}$$

where $r_1$ and $r_2$ are the amounts of variation in the pressure-sensitive electric resistance of A($y$) and A'($y$) respectively.

If $k'_3 = 1/2R^2$, $$Iy = k'_3 \cdot E \cdot (r_1 - r_2)$$

From the equation (9), $$r_1 = k_1 \cdot k_2 \sin(\theta+\delta)$$
$$r_2 = k_1 \cdot k_2 \sin(\theta-\delta)$$

Therefore, $$Iy = k_1 \cdot k_2 \cdot k'_3 \cdot E[\sin(\theta+\delta) - (\sin(\theta-\delta)]$$
$$= 2k_1 \cdot k_2 \cdot k'_3 \cdot E \cdot \cos\theta \cdot \sin\theta$$

If $k' = k_1 \cdot k_2 \cdot k'_3$, $$Iy = 2k' \cdot E \cdot \cos\theta \cdot \sin\delta$$

In FIG. 14, if switch $S_3$ is thrown to the G side, $E$ will be eliminated from this circuit and replaced by the electromotive force $E'$ of the generator G. Assuming that the surveying vehicle has travelled a distance of $\Delta l$ and the time required therefor is $\Delta t$, $Iy$ will become as follows from the equation (12):

$$Iy = 2k' \cdot k_4 \cdot (\Delta l/\Delta t) \cdot \cos\theta \cdot \sin\delta$$

By throwing switch $S_5$ to the W$h$($y$) side in FIG. 14, a current $Iy$ can be passed through the current circuit of the integrating wattmeter W$h$($y$). Here, if the output of W$h$($y$) is $\Delta f_y$, since the equation (13) gives $\Delta f_y = k_5 \cdot e_y \cdot Iy \cdot \Delta t$, $$\Delta fy = 2k' \cdot k_4 \cdot k_5 \cdot e_y \cdot \Delta l \cdot \cos\theta \cdot \sin\delta$$

If a voltage of an appropriate value, that is, $$e_y = 1/(2k' \cdot k_4 \cdot k_5) \quad (16)$$

is previously applied to $Wh(y)$ as the constant voltage $e_y$,
$$\Delta f_y = \Delta l \cdot \cos\theta \cdot \sin\delta \quad (17)$$
If the surveying vehicle continues to travel, the integrated quantity $f_y$ of $Wh(y)$ will be as follows:
$$f_y = \Delta l_1 \cdot \cos\theta_1 \cdot \sin\delta_1 + \Delta l_2 \cdot \cos\theta_2 \cdot \sin\delta_2 + \ldots + \Delta l_n \cdot \cos\theta_n \cdot \sin\delta_n$$
$$= \sum_{j=1}^{n} \Delta l_j \cdot \cos\theta_j \cdot \sin\delta_j$$

From the equation (5),
$$f_y = y$$
Thus, the integrated quantity $f_y$ represents the total departure $y$. If at the start of the surveying operation the predetermined point of the surveying vehicle was at an arbitrary origin 0(0,0,0), the total departure of an arbitrary point N on the ground is $f_y$ which is the integrated quantity of $Wh(y)$ when said predetermined point of the surveying vehicle is at N.

As is evident from the equation (17), i.e. $\Delta f_y = \Delta l \cdot \cos\theta \cdot \sin\delta$, the value of $\cos\theta$ is always positive for the range of $(-\pi/2) < \theta\pi(\pi/2)$, therefore, from the value of azimuth $\delta$, the movement of the scale of the integrating meter will be as shown in the table below.

$$Ix = -2k \cdot k_4 \cdot (\Delta l/\Delta t) \cdot \cos\theta \cdot \cos\delta$$
In FIG. 15, by throwing switch $S_6$ to the $Wh(x)$ side, a current $I_x$ will be passed through the current circuit of the integrating wattmeter $Wh(x)$. Here, if the output of $Wh(x)$ is $\Delta f_x$, since $\Delta_x = k_5 \cdot e_x \cdot Ix \cdot \Delta t$, $\Delta f_x$ will become:
$$\Delta f_x = -2k \cdot k_4 \cdot k_5 \cdot e_x \cdot \Delta l \cdot \Delta l^{cos}\theta \cdot \cos\delta$$
If a voltage of an appropriate value, that is,
$$e_x = -1/(2k \cdot k_4 \cdot k_5) \quad (18)$$
is previously applied to $Wh(x)$ as the constant voltage $e_x$, $\Delta f_x$ will become:
$$\Delta f_x = \Delta l \cdot \cos\theta \cdot \cos\delta \quad (19)$$
When the surveying vehicle continues to travel, the integrated quantity $f_x$ of $Wh(x)$ will be:
$$f_x = \Delta l_1 \cdot \cos\theta_1 \cdot \cos\delta_1 + \Delta l_2 \cdot \cos\theta_2 \cdot \cos\delta_2 + \ldots + \Delta l_n \cdot \cos\theta_n \cdot \cos\delta_n$$
$$= \sum_{j=1}^{n} \Delta l_j \cdot \cos\theta_j \cdot \cos\delta_j$$

From the equation (4), $f_x = x$
Thus, the integrated quantity $f_x$ represents the total latitude $x$. If at the start of the surveying operation a predetermined point of the surveying vehicle was at an arbitrary origin 0(0,0,0), the

| Azimuth ($\delta$) | Surveying vehicle | Rotational direction of armature and electromotive force (E') | Sin $\delta$ | Current passing integrating meter ($I_y$) | Voltage of integrating meter voltage circuit | Movement of integrating meter scale |
|---|---|---|---|---|---|---|
| $0<\delta<\pi$ | Forward | + | + | + | + | Addition. |
|  | Backward | − | + | − |  | Subtraction. |
| $\pi<\delta<2\pi$ | Forward | + | − | − | + | Subtraction. |
|  | Backward | − | − | + | + | Addition. |

III. Measurement of total latitude $x$

At the moment when the surveying vehicle is about to reach a point on the ground where the vertical angle of the earth's surface is $\theta$ and the longitudinal centerline of the surveying vehicle is directed in the direction of $\delta$, the controlled shaft is longitudinally inclined by $\theta$ and the transmission shaft rotates by $\delta$. Therefore the adding shaft rotates by $(\theta+\delta)$ and the subtracting shaft rotates by $(\theta-\delta)$. Accordingly the liquid pressure level $A(x)$ secured in the $(-\pi/2)$ position to the adding shaft rotates by $(-\pi/2+\theta+\delta)$ while the liquid pressure level $A'(x)$ secured in the $(-\pi/2)$ position to the subtracting shaft rotates by $(-\pi/2+\theta-\delta)$.

If the basic electric circuit of $A(x)$ and that of $A'(x)$ are coupled together as shown in FIG. 15, $Ix$ which is the current passing through the ammeter of this composite circuit will be calculated as follows according to Kirchhoff's law:
$$Ix = \frac{E \cdot (r_1 + r_2)}{R^2 + RR'}$$
where $r_1$ is the amount of variation in the pressure-sensitive electric resistance of $A(x)$ and $r_2$ is the same amount of $A'(x)$. Since $k_3 = 1/(R^2 + RR')$
$$Ix = k_3 \cdot E \cdot (r_1 + r_2)$$
From the equation (9),
$$r_1 = k_1 \cdot k_2 \cdot \sin(-\pi/2) + \theta + \delta) = -k_1 \cdot k_2 \cdot \cos(\theta+\delta)$$
$$r_2 = k_1 \cdot k_2 \cdot \sin(-\pi/2) + \theta - \delta) = -k_1 \cdot k_2 \cdot \cos(\theta-\delta)$$
Hence, $Ix = -k_1 \cdot k_2 \cdot k_3 \cdot E \cdot [\cos(\theta+\delta) + \cos(\theta-\delta)]$
$$= -2k_1 \cdot k_2 \cdot k_3 \cdot E \cdot \cos\theta \cdot \cos\delta$$
Since $k = k_1 \cdot k_2 \cdot k_3$, $k Ix$ will become:
$$Ix = -2k \cdot E \cdot \cos\theta \cdot \cos\delta$$
In FIG. 15, if switch $S_3$ is thrown to the G side, $E$ will be eliminated from this circuit and replaced by $E'$ which is the electromotive force of the generator G. If the surveying vehicle has travelled a distance $\Delta l$ and the time required therefor is $\Delta t$, $Ix$ will become as follows from the equation (12):

total latitude of an arbitrary point N on the ground is $f_x$ which is the integrated quantity of $Wh(x)$ when said predetermined point of the surveying vehicle is at N. The movement on the scale of the integrating meter is as shown in the following table.

| Azimuth ($\delta$) | Surveying vehicle | Rotational direction of armature and electromotive force (E') | Cos $\delta$ | Current passing integrating meter ($I_x$) | Voltage of integrating meter voltage circuit | Movement of integrating meter scale ($\Delta x$) |
|---|---|---|---|---|---|---|
| $\frac{\pi}{2}<\delta<\frac{\pi}{2}$ | Forward | + | + | − | − | Addition. |
|  | Backward | − | + | + | − | Subtraction. |
| $\frac{\pi}{2}<\delta<\frac{3\pi}{2}$ | Forward | + | − | + | − | Subtraction. |
|  | Backward | − | − | − | − | Addition. |

For convenience sake, discussion has hitherto been made respectively of the measurement of the difference of elevation $z$, measurement of the total departure $y$ and measurement of the total latitude $x$ carried out according to the present invention. Practically, however, the said three measurements should be made at the same time. Since it is impossible that a predetermined point of the surveying vehicle lies simultaneously at two points on the surface of the earth, the values of $x,y$ and $z$ at a given time represent the spatial position of said point on the earth's surface and thus the determination of the three factors at the same time can be achieved by the present invention. Additionally, the entire process of the above-described surveying operation includes not a single measurement by human means and this of course means the achievement of an automatic surveying operation. Still additionally, as is clear from the equations (15), (17) and (19), these equations do not include a time factor $\Delta t$, since the electromotive force $E'$ of the generator created by the travel of the surveying vehicle as seen in the equation (12) is in inverse proportion to $\Delta t$, whereas the output of $\Delta f$ of the integrating meter which performs integration only while said electromotive force being created is in proportion to $\Delta t$ as seen from the equation (13). This may be more concretely described by stating that if the surveying vehicle moves slowly over a distance the integrating meter also integrates slowly the same value and that if the surveying vehicle moves fast the integrating meter also integrates fast, which means that a high-speed surveying operation may also be achieved by the present invention.

The spirit level devices according to the prior art made use of bubble tubes of circular, rodlike or other shape utilizing the property of liquid whose free surface is always normal to the gravity when it keeps still. However, every one of these conventional level devices was intended to determine either the position of the level when the bubble in the bubble tube comes to a predetermined position or the vertical angle from the position of the bubble, and none of them operates based on the finding that there is a certain relationship between the variation of the total pressure imparted to a certain part of the vessel by the liquid contained therewithin and the rotational angle (and accordingly the vertical angle) of the level.

What is essentially important in the liquid pressure level of the present invention is the pressure variation of the liquid within the vessel, and a single small bubble remaining in the vessel is intended only for use in adjusting the pressure-sensitive electric resistances when they are mounted and in mounting the liquid pressure levels and such bubble does not have to be in use while the level device is being operated.

In the liquid pressure level device according to the present invention, the vertical distance from the horizontal plane passing the point 0 to the liquid surface must not vary with the rotational angle, and therefore, the internal hollow portion of each vessel in use should preferably be uniform in size although the size of the vessel itself may be freely selected.

A greater specific gravity of liquid provides a total pressure variation on the pressure-sensitive electric resistance. In view, however, of the fact that very highly pressure-sensitive electric resistances have been developed, a smaller specific gravity is preferred in order to provide a lesser inertia of the liquid during sharp variation of the rotational angle, although the factor of specific gravity would not lead to any serious error in the pressure variation because the phenomena of delay due to the inertia of the liquid are constantly offset by each other.

The voltage source of the right and left automatic level controller must be a secondary battery of relatively great capacity which is adapted to be constantly chargeable.

The surveying vehicle used with the present invention may be a small four-wheel automobile or, if necessary, a caterpillar vehicle. The rotation of the wheels without corresponding movement of the vehicle or the travelling of vehicle without accompanying the rotation of the wheels must be avoided by all means.

In view of the fact that the armature readily tends to rotate in response to the slightest movement of the surveying vehicle, the gear ratio must be great and preadjustment is required. The generator should preferably have a small size but a high reliability because the power required is such as to operate the three integrating meters and the recording needles of the recorders which may be provided, as required, in the integrating meters.

The integrating meters now commercially available are for the purpose of measuring the power rate and they are low both in sensitivity and reliability. Therefore it may be necessary to manufacture integrating meters specifically suitable for the purpose of the present invention, and such specific meters can readily be obtained by the present-day high manufacturing skill in the art.

The recording needle which is the recorder means of the integrating meter functions to record the integrated value of each integrating meter on a calibrated sheet of paper mounted on a cylindrical member which rotates at a uniform speed. Should the surveying vehicle run in the direction of (N. 45°E.), the recording needle would move beyond the paper sheet with respect to $x$ and $y$ unless the paper sheet on the cylindrical member has an infinite width. Such trouble would also be possible with respect to $z$ depending on the terrain to be surveyed.

For this reason, the recording needle must be adapted to return to its initial position when a certain integrated value is reached within a range which does not exceed the width of the paper sheet in use. Furthermore, since the value of $z$ is usually smaller than the values of $x$ and $y$ although this depends on the area or terrain to be surveyed, the recording needle for $z$ should advantageously be operated with a 20–200 magnification of movement as compared with the movement for $x$ and $y$.

The rotating member of the gyrocompass is directed in the north direction of the true meridian as has already been described. This is because the X-axis of the coordinates is taken in the north direction of the true meridian, and it does not cause any inconvenience even if the rotating member is previously deflected at an angle with respect to the north direction of the true meridian since such deflection may be compensated for by effecting rotational movement to change the coordinates.

For convenience of description, six liquid pressure levels have been shown herein, but the number of liquid pressure levels may be reduced by using a single vessel for $A(y)$ and $A(x)$ and a single vessel for $A'(y)$ and $A'(x)$.

While FIGS. 9, 13, 14 and 15 show the right and left level controller and the arrangements for the measurement of $z$, $y$ and $x$ separately, all these may, in practice, be put together into a unit.

In FIG. 16, $A(h)$ is placed in the horizontal position, switches $S_1$ and $S_2$ are thrown to the E and ⓐ sides respectively, and E is brought to a predetermined value by the voltmeter 38, then it must be ascertained that the recordings of the voltmeters 39 and 40 become equal and that no current passes through the ammeter 41. (No adjustment is made of R', Rx and Ry except in the manufacturing factory.) Thereafter the switches $S_1$ and $S_2$ are changed over to the $n$E and Ⓜ sides respectively whereby the right and left level controller is operational.

Then, $A(z)$ is placed in the horizontal position and switch $S_3$ is thrown to the E side and switches $S_4$, $S_5$, and $S_6$ are successively thrown to the ⓐ side. Thereupon the predetermined value of E is ascertained by the voltmeter 38 and it is ascertained that the readings of the voltmeters 39 and 40 are equal and that no current passes through the ammeters 42 and 43 but a predetermined current passes through the ammeter 44.

After the switch $S_3$ is changed over to the ⓖ side, switches $S_4$, $S_5$ and $S_6$ are successively changed over to the W$h$ side and switch $S_7$ is thrown. A predetermined value of $e$ is ascertained by means of voltmeter 45 and it is ascertained that the readings of the voltmeters 46 and 47 are equal, whereby the measurements of $x$, $y$ and $z$ can be started.

As is evident from the equations (14), (16) and (18), if the $e_z = e$, there are such relations as $e_y = (e \cdot k')/(2k)$ and $e_x = -e/2$. Therefore, as shown in FIG. 16, a predetermined voltage can be applied to W$h(z)$, W$h(y)$ and W$h(x)$ by inserting two equal DC resistances R'' and a DC resistance R'''. (No adjustment is made of R'' and R''' except in the manufacturing factory).

Although "a predetermined point of the surveying vehicle" mentioned previously may be any point of the surveying vehicle, such predetermined point is conveniently provided in the rearward portion of the surveying vehicle so as to easily bring such point into accord with any arbitrary origin 0 and, if required, with any arbitrary station, so that there may be provided a certain range of manual movement of the predetermined point of the surveying vehicle and the quantities of $x$, $y$ and $z$ required for such movement may be adjusted on the scales of W$h(x)$, W$h(y)$ and W$h(z)$ respectively.

FIG. 17 shows an imaginary record achieved by the described embodiment of the present invention. As already described, it is impossible for said one predetermined point of the surveying vehicle to exist at two points at the same time, and therefore, the values of the $x$, $y$ and $z$ existing on a line $t$ of the record represent the spatial position of said one point and the values of $x$ and $y$ denote the plane position thereof.

If the relative integrated values of only $x$ and $y$ are now developed from this record onto the plane rectangular coordinates, the results will be as shown in FIG. 18, wherein the locus of the travel of the surveying vehicle is depicted. The symbols $n_1, n_2, \ldots n_7$ are the stations to be sought, of which the coordinates can be known by $x$ and $y$ and their relative positions may be shown as in FIG. 19. The speed of the surveying vehicle can be calculated from the locus of the surveying vehicle shown in FIG. 18 and the time $t$ shown in the record of FIG. 17, although it is as directly unnecessary as the locus of the surveying vehicle's travel. Further, in FIG. 17, the points lying on the same ordinate scale z represent an equal elevation, and therefore, by combining the points determined by the x and y which lie on the lines t for said points lying on the same ordinate scale z, contour lines can be depicted as shown in FIG. 19 which is obtained from such procedure.

It will be apparent from the foregoing description that according to the apparatus of the present invention there is little or no possibility of personal error arising from the actions of an operator. Of course the device of the invention itself could be subject to some instrumental error or the like, although a sufficiently high reliability of accuracy of performance required to meet the end purposes of surveying can be provided by the current technical level of manufacturing in the art. Also, most of the instrumental errors are of such nature that they are negated by each other during the measuring operation, and other errors which could not be so negated and might be propagated can be corrected by the record of the measurement.

The method of the present invention is of a nature that it should be included among the various existing methods of surveying. It is believed, however, that when it is desired to effect surveying on an untrodden planet to obtain the map thereof, the present invention will make possible what is impossible with the conventional land-surveying method. This will be achieved by soft-landing the device of the present invention on such untrodden planet, causing it to run thereon through a remote control system and causing the record obtained by the device to be transmitted to the earth through radio waves whereby the topography of the surface of the planet can be graphically obtained. For this purpose, it is first of all necessary to develop the device of the present invention and fully put it into use and practice on the earth.

What is claimed is:

1. An automatic surveying apparatus, comprising a controlled shaft having means for mounting said shaft along the longitudinal axis of a vehicle for free rotation around the longitudinal axis of said controlled shaft, an automatic level controller coupled to said controlled shaft for maintaining the angular rotational position of said shaft about its longitudinal axis constant with respect to the horizontal as the vehicle inclines from side to side, an elevation-measuring level fixedly mounted on said controlled shaft with the normally level position of said level parallel to the axis of said controlled shaft, whereby the horizontal position of the elevation-measuring level is changed as the longitudinal axis of the controlled shaft is inclined as the vehicle is inclined frontwardly or rearwardly, two lateral shafts rotatably mounted on said controlled shaft and extending laterally in opposite directions from said controlled shaft perpendicular to the longitudinal axis thereof and horizontally, one of said shafts being an adding shaft and the other being a subtracting shaft, a means for indicating a reference azimuth, said means being adapted to be mounted on said vehicle for producing a movement proportional to the change in direction of said vehicle relative to the reference azimuth, said means being coupled between said last-mentioned means and said adding and subtracting shafts for turning one of said shafts in one direction and the other in the other direction an amount proportional to the change of the direction of the vehicle from the reference azimuth, two departure-measuring levels, one fixed on each of said two shafts with the normally level position of each level parallel to the longitudinal axis of said controlled shaft, two latitude-measuring levels, one fixed on each of said two shafts with the normally level position of each level perpendicular to the longitudinal axis of said controlled shaft, each of said elevation-measuring levels, departure-measuring levels and latitude-measuring levels being liquid levels having liquid pressure-sensitive electrical resistance therein responsive to changes in the liquid pressure in said levels in proportion to the amount the position of the levels changes, each of said levels having an electrical circuit coupled thereto in which said resistances are incorporated for producing a current when the level is moved from its normal level position, power supply means coupled to said electrical circuits and adapted to be coupled to said vehicle to provide a power output in proportion to the speed of the vehicle, the circuits for said two departure-measuring levels being coupled to each other for producing a current flow in proportion to the departure of the vehicle from a point of origin, and the circuits for said two latitude-measuring levels being coupled to each other for producing a current flow in proportion to the latitude of the vehicle from a point of origin, and integrating means to which the circuits of the departure-measuring levels are coupled, to which the circuits of the latitude-measuring levels are coupled, and to which the circuit of the elevation-measuring level is coupled for integrating the outputs of said circuits.

2. An automatic surveying apparatus as claimed in claim 3 further comprising recording means coupled to each of said integrating means for recording the outputs of said integrating means.

3. An automatic surveying apparatus as claimed in claim 3 in which said automatic level controller comprises a liquid level having liquid pressure-sensitive electrical resistances therein responsive to changes in the liquid pressure in said level in proportion to the amount the position of the level changes, motor means coupled to said controlled shaft for rotating said controlled shaft, and a driving circuit connected between said resistances and said motor means for driving said motor means to rotate said controlled shaft in a direction to bring said liquid level to level position when the vehicle is inclined to the side.

4. An automatic surveying apparatus as claimed in claim 3 in which said liquid levels each comprise a hollow annular vessel, mounting means on the axis of the annular vessel for mounting the vessel on a shaft, and liquid filling said vessel and having a small bubble for use in properly leveling the level on a shaft, and said electrical resistances are mounted on said vessel at opposite ends of a diameter thereof and include a pressure-responsive resistance material and diaphragm means contacting said resistance material and exposed to the liquid within the vessel.

5. An automatic surveying apparatus as claimed in claim 3 in which said controlled shaft is a hollow shaft, said means for indicating a reference azimuth is a gyro having a housing with a shaft extending therefrom which rotates as the vehicle turns around the gyro, and said means for turning the adding and subtracting shafts comprises a transmission shaft coupled to said gyro housing shaft for rotation thereby and geared to said adding and subtracting shafts.